United States Patent
Lee

(10) Patent No.: US 12,417,625 B2
(45) Date of Patent: Sep. 16, 2025

(54) LOSS CONTRIBUTION DETECTING METHOD AND LOSS CONTRIBUTION DETECTING SYSTEM

(71) Applicant: Mitsubishi Electric Corporation, Tokyo (JP)

(72) Inventor: Teng-Yok Lee, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 374 days.

(21) Appl. No.: 18/142,240

(22) Filed: May 2, 2023

(65) Prior Publication Data

US 2023/0267722 A1  Aug. 24, 2023

Related U.S. Application Data

(63) Continuation of application No. PCT/JP2021/006999, filed on Feb. 25, 2021.

(51) Int. Cl.
*G06V 10/82* (2022.01)
*G06V 10/44* (2022.01)
*G06V 10/774* (2022.01)

(52) U.S. Cl.
CPC .......... *G06V 10/82* (2022.01); *G06V 10/44* (2022.01); *G06V 10/774* (2022.01)

(58) Field of Classification Search
CPC ...... G06V 10/82; G06V 10/44; G06V 10/774; G06N 3/045; G06N 3/084; G06N 3/08; G06N 20/00
USPC ....................................................... 382/156
See application file for complete search history.

(56) References Cited

U.S. PATENT DOCUMENTS

| 11,636,569 B1* | 4/2023 | Xu .......................... G06N 3/08 382/156 |
|---|---|---|
| 2019/0362228 A1 | 11/2019 | Sato et al. |
| 2020/0175377 A1 | 6/2020 | Iio et al. |

FOREIGN PATENT DOCUMENTS

| JP | 2018-513507 A | 5/2018 |
|---|---|---|
| JP | 2019-204190 A | 11/2019 |
| JP | 2020-91543 A | 6/2020 |
| WO | WO 2016/150472 A1 | 9/2018 |
| WO | WO-2019017990 A1 * | 1/2019 ............. G06N 20/00 |

* cited by examiner

*Primary Examiner* — Neil R McLean
(74) *Attorney, Agent, or Firm* — Birch, Stewart, Kolasch & Birch, LLP

(57) ABSTRACT

An exemplary method comprises calculating products, each product being generated by multiplying a first result given by applying one of a plurality of input data used for training a machine learning model to a first function that represents a forward propagation of the plurality of input data through the machine learning model, and a second result given by applying the one of the plurality of input data to a second function that represents a backward propagation of a partial differential of a loss therethrough, the loss being generated by summing errors between desired values that the machine learning model should output in response to the plurality of input data and prediction values that the machine learning model outputs in response thereto; and detecting among the plurality of input data, input data that contributes the most to the loss, based on magnitudes of the products.

5 Claims, 14 Drawing Sheets

Input Data x
(x1 to xn)

LOSS CONTRIBUTION DETECTING METHOD AND LOSS CONTRIBUTION DETECTING SYSTEM

CROSS REFERENCE TO RELATED APPLICATIONS

This application is a Continuation of PCT International Application No. PCT/JP2021/006999 filed on Feb. 25, 2021, which is hereby expressly incorporated by reference into the present application.

TECHNICAL FIELD

The present disclosure relates to methods and systems for training neural networks, and more particularly to methods and systems for detecting factors that contribute to a loss of a neural network.

BACKGROUND ART

For training the neural network, enormous training data prepared or collected in advance are used. Among such enormous training data, there may be training data that contributes the most to the loss of the neural network, that is, exacerbates the loss of the neural network. To detect the above training data, the extremely huge amount of calculation is required for conventional methods.

Japanese Patent Laid-Open No. 2019-204190 on neural networks teaches, for example, a method of updating parameters in a neural network based on a loss function or an inverse loss function of the neural network, and more particularly a method of determining based on these functions, whether updating the parameters should be performed.

However, in training the neural network above, even by adopting the method taught in the publication above, the computational amount required to detect the above training data is not reduced, thus the time needed to detect the above training data is not reduced.

SUMMARY OF THE INVENTION

To solve the above problem, an aspect of the present disclosure provides a method that comprises calculating a plurality of products, each product being generated by multiplying a first result given by applying one of a plurality of input data used for training a machine learning model to a first function that represents a forward propagation of the plurality of input data through the machine learning model, and a second result given by applying the one of the plurality of input data to a second function that represents a backward propagation of a partial differential of a loss through the machine learning model, the loss being generated by summing a plurality of errors between a plurality of desired values that the machine learning model should output in response to the plurality of input data and a plurality of prediction values that the machine learning model outputs in response to the plurality of input data; and detecting among the plurality of input data, input data that contributes the most to the loss, based on magnitudes of the plurality of products.

Another aspect of the present disclosure provides the method that further comprises increasing magnitudes of a plurality of weights used for retraining the detected input data.

Still another aspect of the present disclosure provides the method that further comprises removing the detected input data; and retraining the machine learning model using the remainder of the plurality of input data except for the removed input data.

Still another aspect of the present disclosure provides the method that further comprises in a case where the plurality of input data are a plurality of image data that are each segmented into a plurality of image areas, distinguishing in each of the plurality of image data, at least one image area that contributes more to the loss and other image areas that contribute less to the loss, based on magnitudes of the plurality of products for the plurality of image areas in lieu of the plurality of input data.

Still another aspect of the present disclosure provides a system that comprises a processor to execute a program; and a storage to store the program which, when executed by the processor, performs processes of, calculating a plurality of products, each product being generated by multiplying a first result given by applying one of a plurality of input data used for training a machine learning model to a first function that represents a forward propagation of the plurality of input data through the machine learning model, and a second result given by applying the one of the plurality of input data to a second function that represents a backward propagation of a partial differential of a loss given by summing a plurality of errors between a plurality of desired values that the machine learning model should output in response to the plurality of input data and a plurality of prediction values that the machine learning model outputs in response to the plurality of input data, and detecting among the plurality of input data, input data that contributes the most to the loss, based on magnitudes of the plurality of products.

DESCRIPTION OF EMBODIMENTS

First Embodiment

A neural network system according to a first embodiment of this disclosure will now be described with reference to FIGS. 1 to 5.

Figure 1:
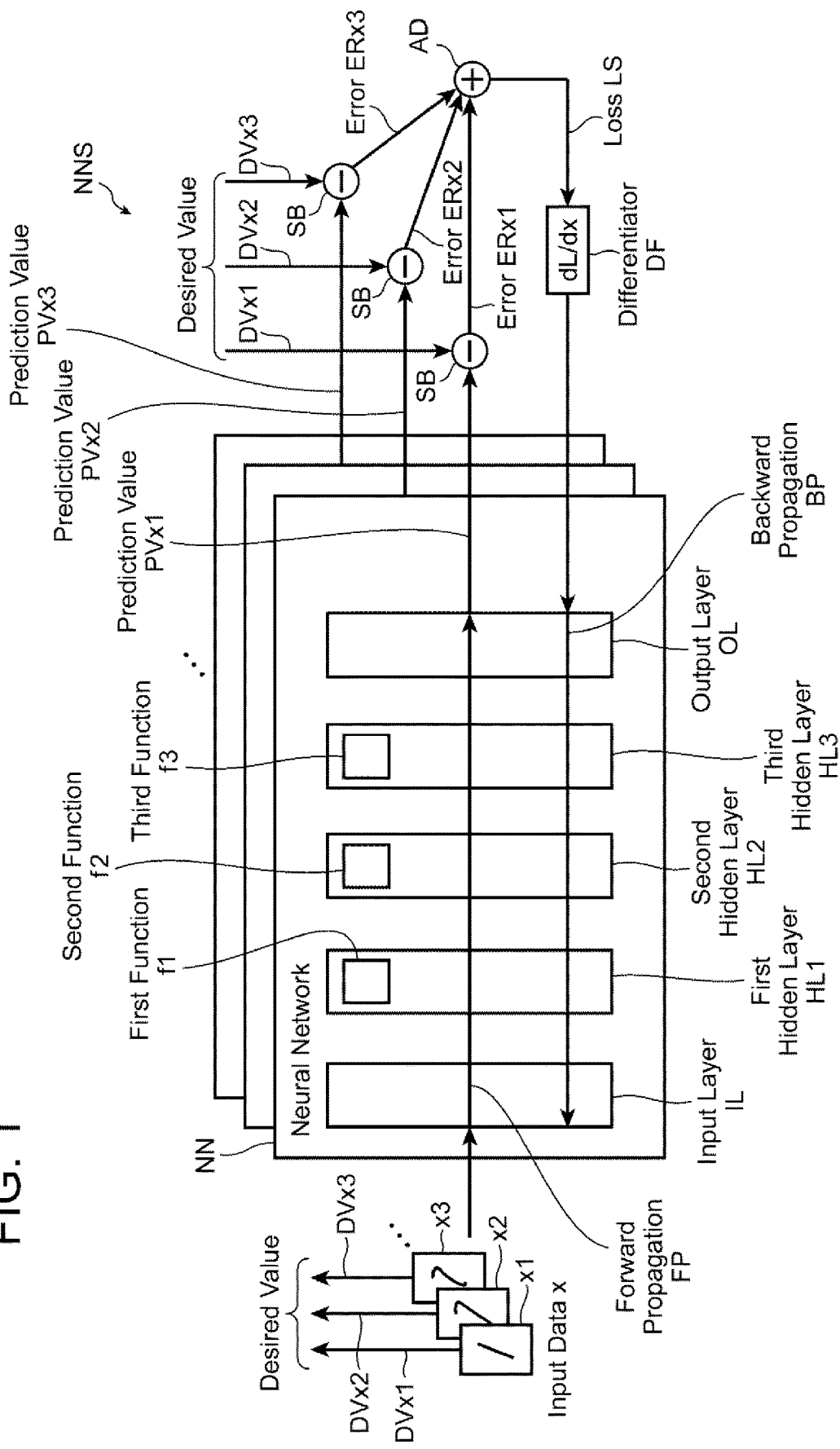
FIG. 1 is a block diagram showing a configuration of a neural network system according to a first embodiment.

FIG. 1 is a block diagram showing a configuration of the neural network system according to the first embodiment. As shown in FIG. 1, the neural network system NNS, which is one of machine learning models, includes a single neural network NN, a single subtractor SB, an adder AD, and a differentiator DF. The neural network NN includes an input layer IL, a first hidden layer HL1, a second hidden layer HL2, a third hidden layer HL3, and an output layer OL.

The input layer IL receives input data x, that is, a set of input data x1, x2, x3, . . . , and xn (n denotes a given positive integer, but not shown). Hereinafter, for ease of explanation and understanding, explanation will be given relevant to input data x1, x2, and x3.

The input data x1, x2, and x3 are each for example, image data, for example. More specifically, the input data x1, x2, and x3 are hand-written image data of the numeric character "1." However, one thereof may rather be similar to the numeric character "7" while other thereof may rather be similar to the numeric character "2", for example.

As shown in FIG. 1, the first hidden layer HL1 has a first function f1, the second hidden layer HL2 has a second function f2, and the third hidden layer HL3 has a third function f3. The functions f1, f2, and f3 represent the operations for data fed into the hidden layers HL1, HL2, and HL3, respectively.

For example, the input data x1 is fed into the first hidden layer HL1 through the input layer IL. In response to the input data x1, the first hidden layer HL1 processes the input data x1 according to the first function f1. Consequently, the first hidden layer HL1 provides to the second hidden layer HL2, the processed input data x1, that is, the result of operation pursuant to the function f1 on data fed into the first hidden layer HL1.

Similarly to the first hidden layer HL1, the second hidden layer HL2 provides to the third hidden layer HL3, the result of operation pursuant to the second function f2 on data fed into the second hidden layer HL2. Further similarly to the first hidden layer HL1 and the second hidden layer HL2, the third hidden layer HL3 provides to the output layer OL, the result of operation pursuant to the third function f3 on data fed into the third hidden layer HL3.

In summary, as shown in FIG. 1, the input data x1 experiences the forward propagation FP through the first hidden layer HL1, the second hidden layer HL2, and the third hidden layer HL3 in this order; similarly, the input data x2 and x3 each experience the forward propagation FP through those hidden layers HL1, HL2, and HL3.

The output layer OL outputs the results of the third hidden layer HL3, and more specifically, the result derived from the input data x1, the result derived from the input data x2, and the result derived from the input data x3. The results provided from the output layer OL to the outward of the neural network NN will each hereinafter be referred as "prediction value."

For example, on receipt of the input data x1, the prediction value PVx1 is provided. More concretely, the input data x1 undergoes the operations of the first, second, and third functions f1, f2, and f3, which brings the prediction value PVx1. Similarly, to the above, the input data x2 undergoes the operations of the first, second, and third functions f1, f2, and f3, which brings the prediction value PVx2 while the input data x3 undergoes the operations of the first, second, and third functions f1, f2, and f3, which brings the prediction value PVx3. The prediction values PVx1, PVx2, and PVx3 are fed into the subtractor SB, respectively.

On the other hand, as shown in FIG. 1, the input data x1, x2, and x3 are accompanied by desired values or true values DVx1, DVx2, and DVx3, respectively. The desired values DVx1, DVx2, DVx3 are defined as criteria used for judging whether the prediction values PVx1, PVx2, and PVx3 are good or bad, that is, right or wrong. The desired value DVx1, DVx2, and DVx3 are provided from the input data x1, x2, and x3 to the subtractor SB. For example, the desired value DVx1 is fed from the input data x1 to the subtractor SB. Similarly, the desired value DVx2 is fed from the input data x2 to the subtractor SB while the desired value DVx3 is fed from the input data x3 to the subtractor SB.

On receipt of the prediction values PVx1, PVx2, and PVx3 from the neural network NN and the desired values DVx1, DVx2, and DVx3 from the input data x1, x2, x3, the subtractor SB implements a subtraction between the prediction values PVx1, PVx2, PVx3, and the desired values DVx1, DVx2, DVx3, thus yielding errors or differences therebetween. More specifically, for example, on receipt of the prediction value PVx1 and the desired value DVx1, the subtractor SB implements the subtraction between the prediction value PVx1 and the desired value DVx1, thereby yielding an error ERx1. Similarly, the subtractor SB implements the subtraction between the prediction value PVx2 and the desired value DVx2, thereby yielding an error ERx2; it also implements the subtraction between the prediction value PVx3 and the desired value DVx3, thereby yielding an error ERx3. The errors ERx1, ERx2, and ERx3, which result from or are derived from the input data x1, x2, and x3, are fed into the adder AD.

Upon receipt of the errors ERx1, ERx2, and ERx3, the adder AD sums all the errors ERx1, ERx2, and ERx3 to produce a loss LS, which is provided into the differentiator DF.

The differentiator DF executes a partial derivative or a partial differential on the loss LS with respect to input data x.

As shown in FIG. 1, the partially differentiated loss LS, that is, $dL/dx$ undergoes the backward propagation BP through the third hidden layer HL3, the second hidden layer HL2, and the first hidden layer HL1 in this order.

Figure 2:
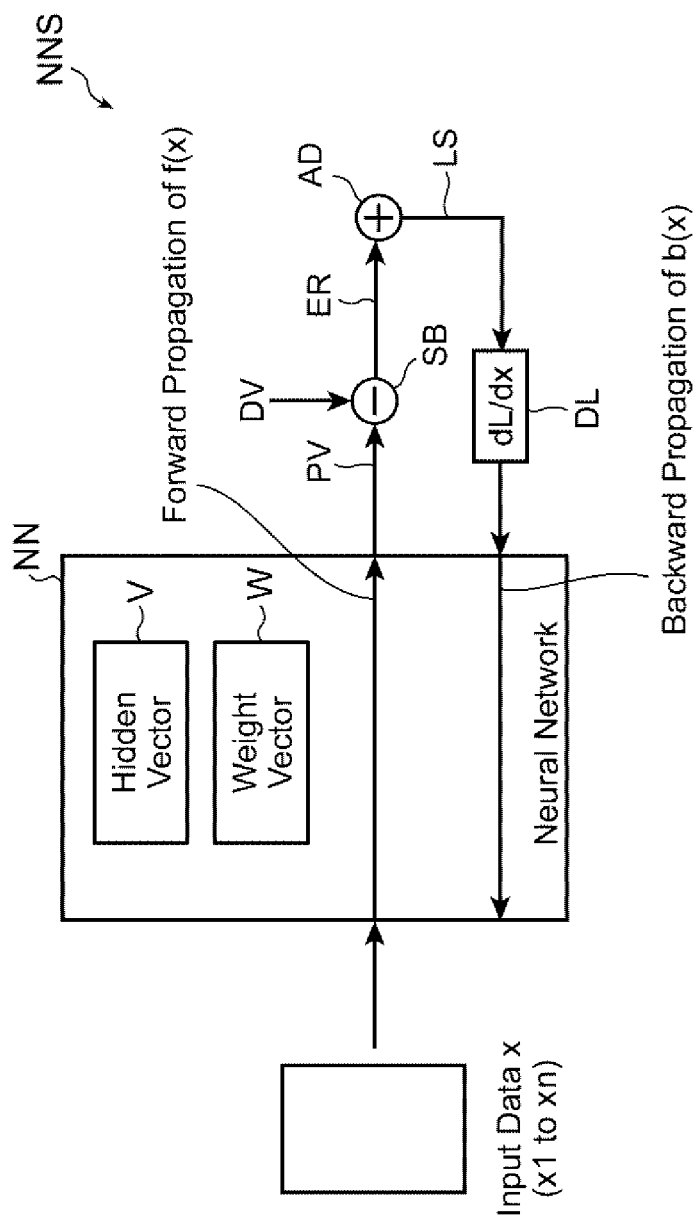
FIG. 2 is a block diagram showing a configuration of the neural network system including a hidden vector V and a weight vector W according to the first embodiment.

FIG. 2 is a block diagram showing a configuration of a neural network system including a hidden vector V and a weight vector W according to the first embodiment. As shown in FIG. 2, the neural network NN has a function f, a function b, a hidden vector V, and a weight vector W.

The function f is defined as a function composed by nesting the functions f1, f2, and f3 shown in FIG. 1. More specifically, for example, a function $f(x1)$ is defined as $f3(f2(f1(x1)))$. As deduced from the above definition of the function f, input data x, which is a set of input data x1 to xn, undergoes the forward propagation FP (in FIG. 1) under the operation of the function f, as shown in FIG. 2.

The function b is, as well known, defined as a subject of the backward propagation BP (in FIG. 1) for adjusting parameters in the neural network NN. The input data x, more exactly, the error ER or the loss LS undergoes the backward propagation BP in the network NN, as shown in FIG. 2.

The hidden vector V is representative of each of the first, second, and third functions f1, f2, and f3.

The weight vector W has the same length of the function f Each of elements in the weight vector W is representative of the weight for the element corresponding thereto in the function f.

In the neural network system NNS of FIG. 2, the neural network NN receives the input data x. The input data x experiences the forward propagation FP as the function f(x) on condition of the hidden vector V and the weight vector W, whereby the prediction value PV is provided to the subtractor SB. The subtractor SB performs the subtraction between the prediction value PV and the desired value DV, thereby providing the error ER to the adder AD. The adder AD sums the errors ER to produce the loss LS, which is outputted to the differentiator DF. The differentiator DF executes a partial derivative on the loss LS, whereby the partially differentiated loss LS experiences the backward propagation BP as the function b(x).

Hereinafter, the below formula (1A) is assumed.

$$LS=f(V(x)) \tag{1A}$$

The above formula (1A) is approximated to the below formula (1B).

$$LS=f(V(x)) \sim V(x)*W(x) \tag{1B}$$

Herein, relationships below are established.
(1-1) V(x) is identical to the function f(x), more exactly, to the forward propagation FP of the function f(x),
(1-2)
  (1-2-1) by linearly approximating the loss LS, W(x) is equivalent to the partially differentiated,
  (1-2-2) the partial derivative or partial differential is given by the backward propagation, and
  (1-2-3) from the above (1-2-1) and (1-2-2), W(x) is replaced with b(x), more exactly, with the backward propagation BP of the function b(x).

Accordingly, the formula (1) is converted to the below formula (2) including a plurality of products represented by f(xi)*b(xi). This conversion is achieved on the basis of the above relationships, that is to say, by applying Taylor expansion and by utilizing b(x) as the partial derivative on the assumption that the partial derivative is constant on the linear equation.

$$LS \sim \sum_{i=1}^{n}(f(xi)*b(xi)) \tag{2}$$

The above formula (2) indicates, for example, that on condition of 1<=a<=n, if f(xa)*b(xa) is the largest among f(x1)*b(x1) to f(xn)*b(xn), the input data xa contributes the most to the loss LS. On the contrary, the above formula (2) indicates that on condition of 1<=b<=n, if f(xb)*b(xb) is the smallest among f(x1)*b(x1) to f(xn)*b(xn), the input data xb contributes the least to the loss LS.

To avoid that the impact or influence of negative products upon the loss LS cancel or invalidate the impart or influence of positive products upon the loss LS, only positive products are preferably considerable.

Positive products exacerbate or deteriorate the loss LS, thus complicating or perplexing the training of the neural network NN. In constant, negative products improve or ameliorate the loss LS, thus facilitating or simplifying the training of the neural network NN.

In both the above cases, the magnitude of weights used for processing the input data xa, and the magnitude of other weights used for processing the input data xb are preferably adjusted according to the contribution to the loss LS. For example, in the former case, the magnitude of the weights used for processing the input data xa is preferably increased. In contrast, in the latter case, the magnitude of the weights used for processing the input data xb is preferably decreased.

Figure 3:
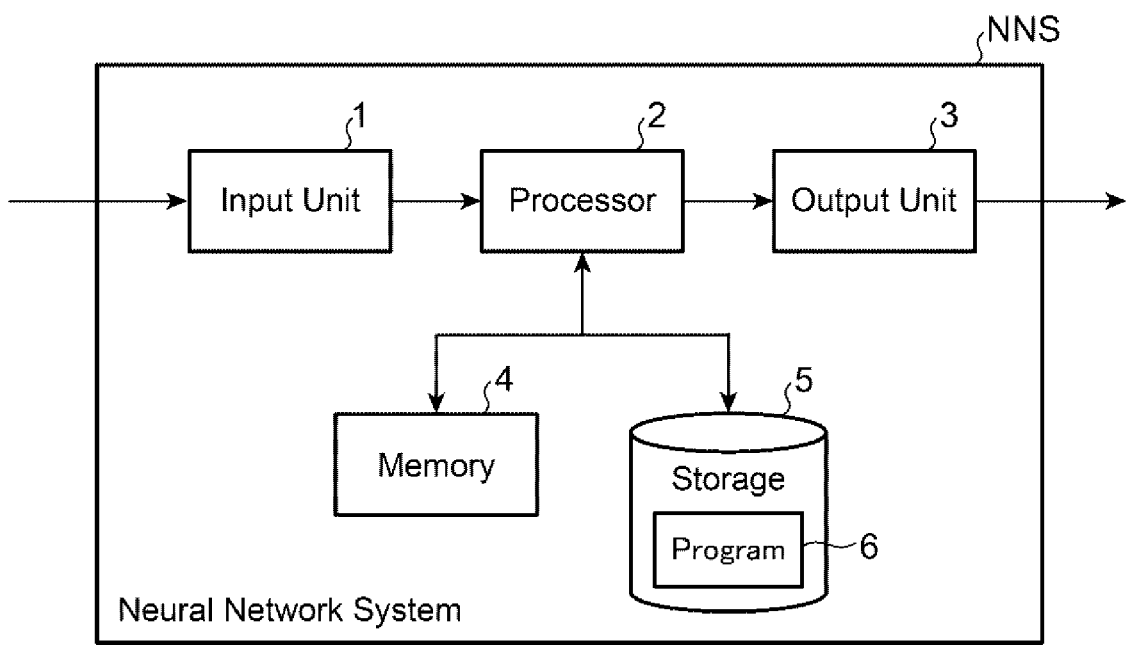
FIG. 3 is a block diagram showing a configuration of the neural network system according to the first embodiment from the constructional viewpoint.

FIG. 3 is a block diagram showing a configuration of the neural network system NNS according to the first embodiment from the constructional viewpoint. As shown in FIG. 3, from the constructional viewpoint, the neural network system NNS includes an input unit 1, a processor 2, an output unit 3, a memory 4, and a storage 5. The storage 5 has a program 6 that defines the operation of the processer 2.

Figure 4:
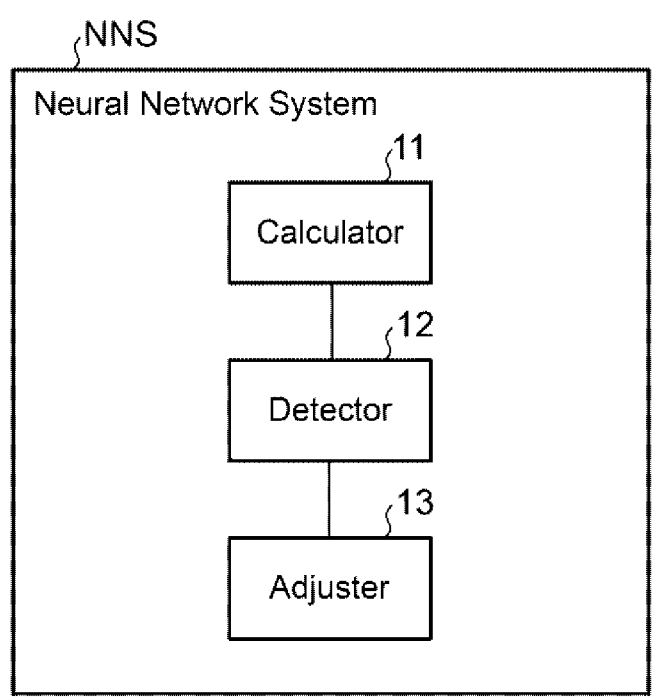
FIG. 4 is a block diagram showing a configuration of the neural network system according to the first embodiment from the functional viewpoint.

FIG. 4 is a block diagram showing a configuration of the neural network system NNS according to the first embodiment from the functional viewpoint. As shown in FIG. 4, from the functional viewpoint, the neural network system NNS includes a calculator 11, a detector 12, and an adjuster 13.

With reference to FIGS. 3 and 4, the input unit 1 and the output unit 3 serve as a user interface for a user manipulating the neural network system NNS; the processor 2 acts as the calculator 11, the detector 12, and the adjuster 13 by executing on the memory 4 the program 6 in the storage 5.

Figure 5:
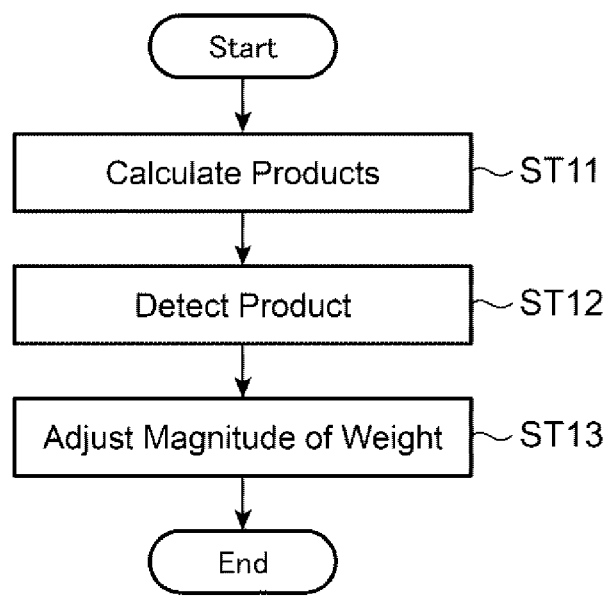
FIG. 5 is a flowchart showing the operation of the neural network system according to the first embodiment.

FIG. 5 is a flowchart showing the operation of the neural network system NNS according to the first embodiment. At step ST11, as the calculator 11, the processor 2 calculates a plurality of products, more specifically, the above-discussed f(xi)*b(xi). At step ST12, as the detector 12, the processor 2 detects a product among the plurality of the products above. For example, the processor 2 detects among the plurality of products, the product f(xa)*b(xa) that is the largest thereamong as described above. In contrast, for example, the processor 2 detects among the plurality of products, the product f(xb)*b(xb) that is the smallest thereamong as described above. In other words, the processor 2 detects the input data xa of which product is the largest and the input data xb of which product is the smallest. At step ST13, as the adjuster 13, the processor 2 adjusts magnitudes of weights corresponding to input data whose product is the largest or the smallest. For example, as discussed above, the processor 2 increases the magnitude of the weights used for the input data xa. On the contrary, as discussed above, the processor 2 decreases the magnitudes of the weights used for the input data xb.

As explained above, the neural network system NNS according to the first embodiment calculates the plurality of products f(x1)*b(x1) to f(xn)*b(xn) by using the above formula (2) linearly approximated, for example, thus detecting the largest product f(xa)*b(xa) and the smallest product f(xb)*b(xb). This leads to reduction of computational amount required for detecting such products, thereby decreasing time required therefor. In addition, the detection method using the formula (2) according to the first embodiment is versatilely applicable, and for example, applicable to image classification and object detection.

Second Embodiment

A neural network system NNS according to a second embodiment will now be described with reference to FIGS. 6 to 8.

Figure 6:
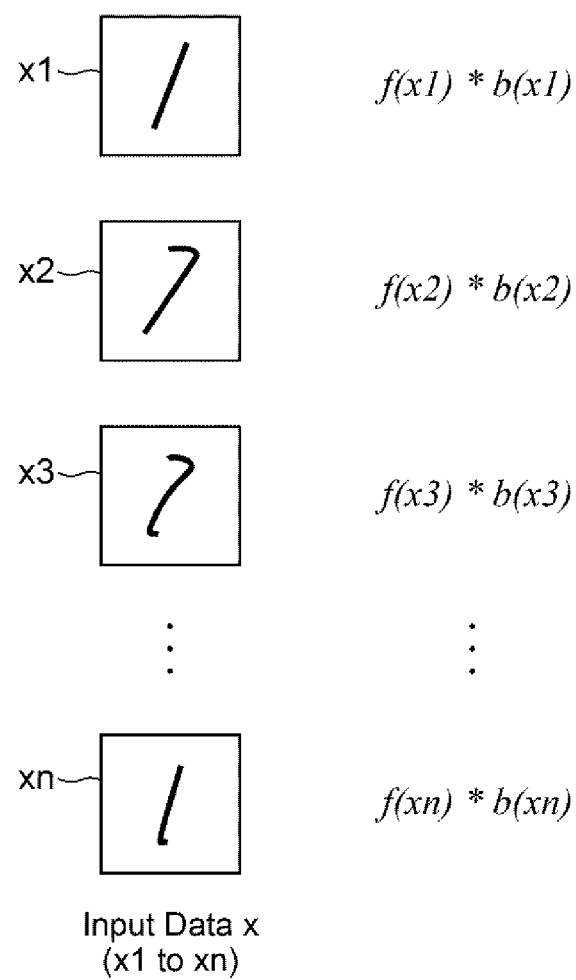
FIG. 6 shows image data used for training a neural network system according to a second embodiment.

FIG. 6 shows image data used for training the neural network system NNS according to the second embodiment. A set of input data, that is, a plurality of input data are image data that each should represent the numeral character "1." For example, the input data x1 accurately indicates the numeral character "1." However, among the input data, there may be input data x2 that is rather similar to the numeral character "7" and may be other input data x3 that is rather similar to the numeral character "2."

Similarly to the first embodiment, the neural network system NNS of the second embodiment has the construction shown in FIG. 3 from the constructional viewpoint.

Figure 7:
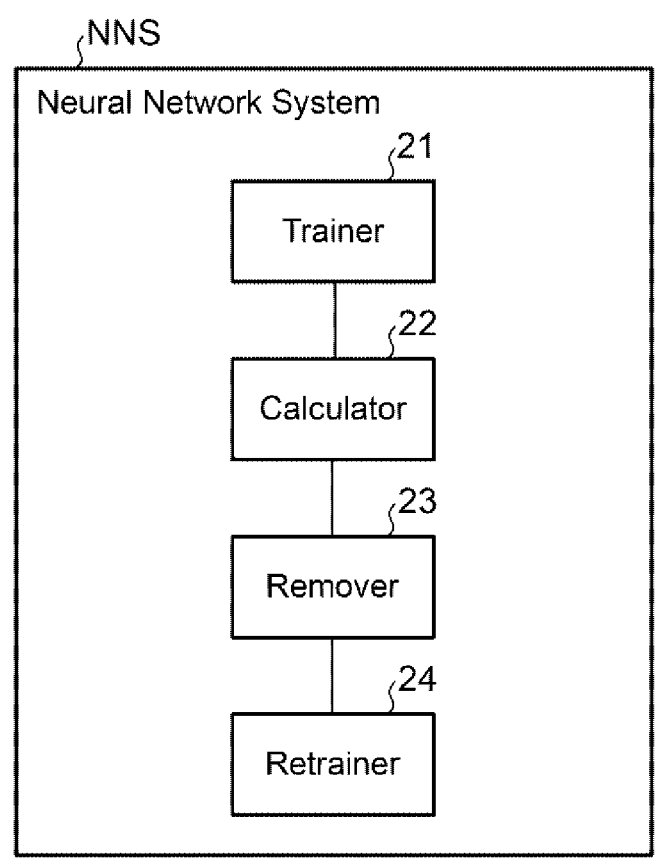
FIG. 7 is a block diagram showing a configuration of the neural network system according to the second embodiment from the functional viewpoint.

FIG. 7 is a block diagram showing a configuration of the neural network system NNS according to the second embodiment from the functional viewpoint. As shown in FIG. 7, from the functional viewpoint, the neural network system NNS of the second embodiment includes a trainer 21, a calculator 22, a remover 23, and a retrainer 24.

With reference to FIGS. 3 and 7, the processor 2 acts as the trainer 21, the calculator 22, the remover 23, and the retrainer 24 by executing on the memory 4 the program 6 in the storage 5.

Figure 8:
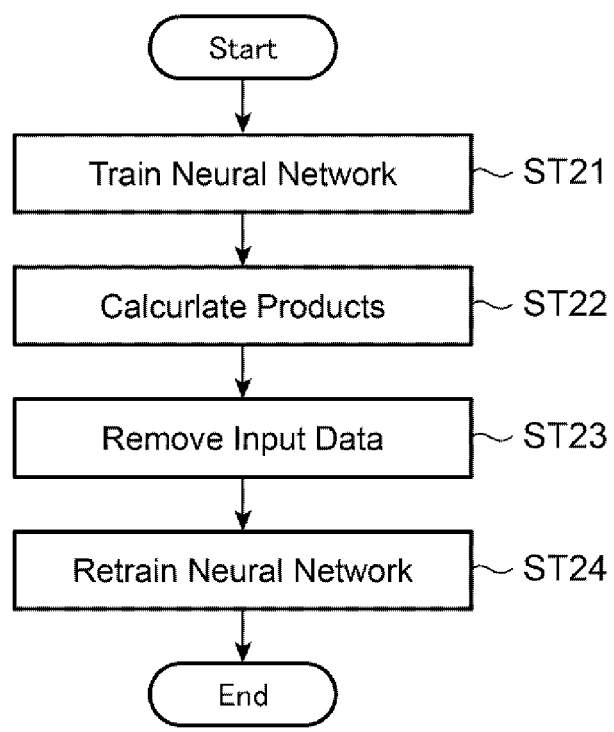
FIG. 8 is a flowchart showing the operation of the neural network system according to the second embodiment.

FIG. 8 is a flowchart showing the operation of the neural network system NNS according to the second embodiment.

On receipt of the input data x, that is, input data x1 to xn (shown in FIG. 6), at step ST21, as the trainer 21, the processor 2 trains the neural network NN by using the input data x.

At step ST22, as the calculator 22, the processor 2 calculates a plurality of products, more specifically, the above discussed f(xi)*b(xi), including f(x1)*b(x1), f(x2)*b(x2), f(x3)*b(x3), . . . , f(xn)*b(xn) as shown in FIG. 6.

Herein, it is assumed that the product f(x3)*b(x3) is the largest among all the products f(x1)*b(x1) to f(xn)*b(xn).

At step ST23, as the remover 23, the processor 2 removes or excludes among the input data x, that is, input data x1, x2, x3, . . . , and xn, the input data x3 corresponding to the largest product f(x3)*b(x3).

At step ST24, as the retrainer 24, the processor 2 retrains the neural network NN by using the remainder of the input data x except for the input data x3.

If the above retraining does not improve or reduce the loss LS, another additional retraining of the neural network NN is desirably performed by using all the input data x including the above temporarily removed input data x3.

As explained above, the neural network system NNS according to the second embodiment experiences the retraining that utilizes the remainder of the input data x except for the input data x3 corresponding to the largest product f(x3)*b(x3). This reduces the time required for training the neural network system NNS.

Third Embodiment

A neural network system NNS according to a third embodiment will now be described with reference to FIGS. 9 to 14.

Figure 9:
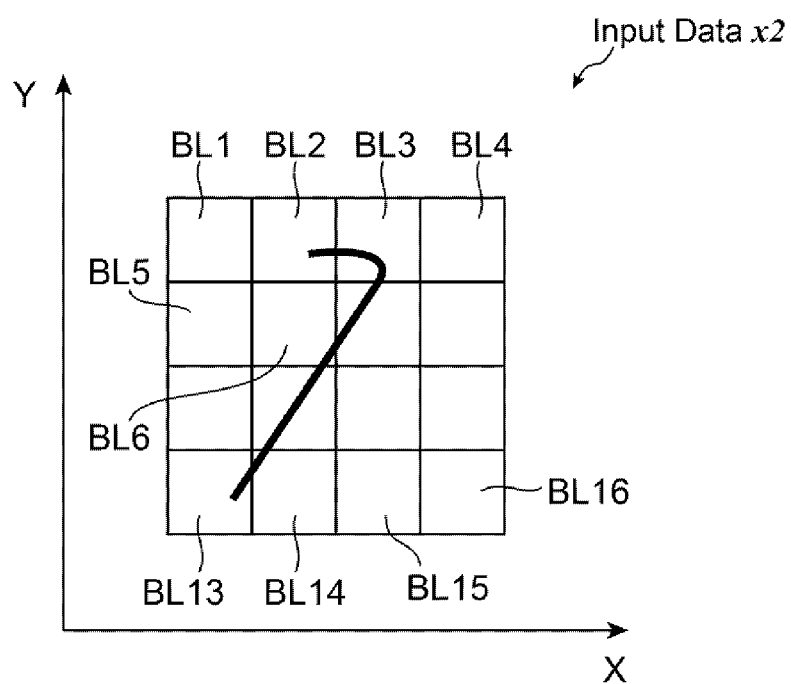
FIG. 9 shows image data used for training a neural network system according to a third embodiment.

FIG. 9 shows image data used for training the neural network system NNS according to the third embodiment. The input data fed into the neural network system NNS of the third embodiment is identical to the input data x2 (shown in FIG. 6 of the second embodiment). As discussed in the second embodiment, the input data x2, which is image data that should originally represent the numeral character "1", however, may actually be rather similar to the numeral character "7." As shown in FIG. 9, the input data x2 is segmented or divided into a plurality of image blocks BL1 to BL16. As explained later, every four image blocks among those image blocks BL1 to BL16 form one image area.

Figure 10:
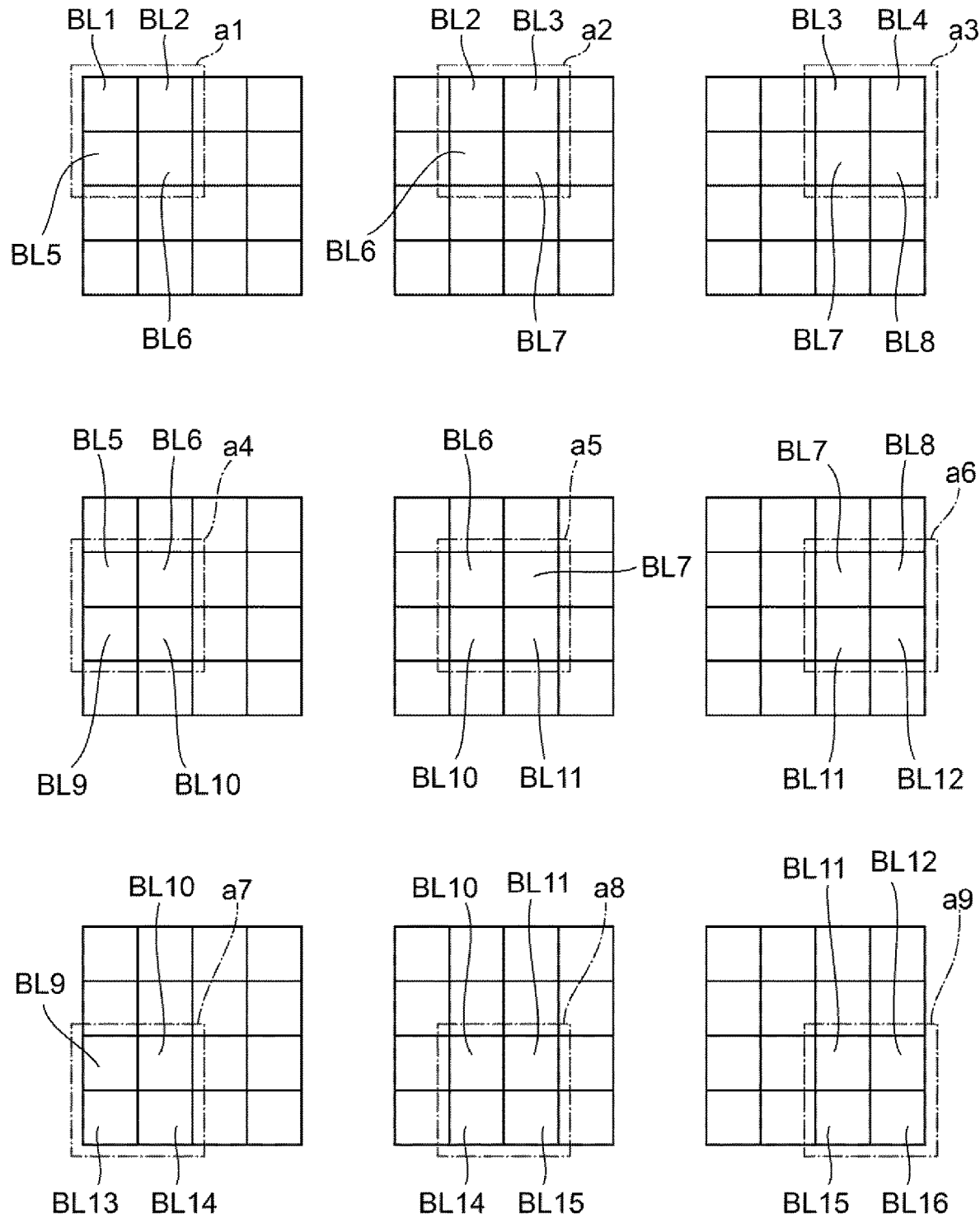
FIG. 10 shows relationships between image blocks data and image areas in image according to the third embodiment.

FIG. 10 shows relationships between image blocks and image areas in image data according to the third embodiment. As shown in FIG. 10, among the image blocks BL1 to BL16, adjacent four image blocks form one image area. For example, the image blocks BL1, BL2, BL5, and BL6 adjacent to each other form the image area a1. Similarly, the image blocks BL2, BL3, BL6, and BL7 adjacent to each other form the image area a2, and further the image blocks BL11, BL12, BL15, and BL16 adjacent to each other form the image area a9.

Figure 11:
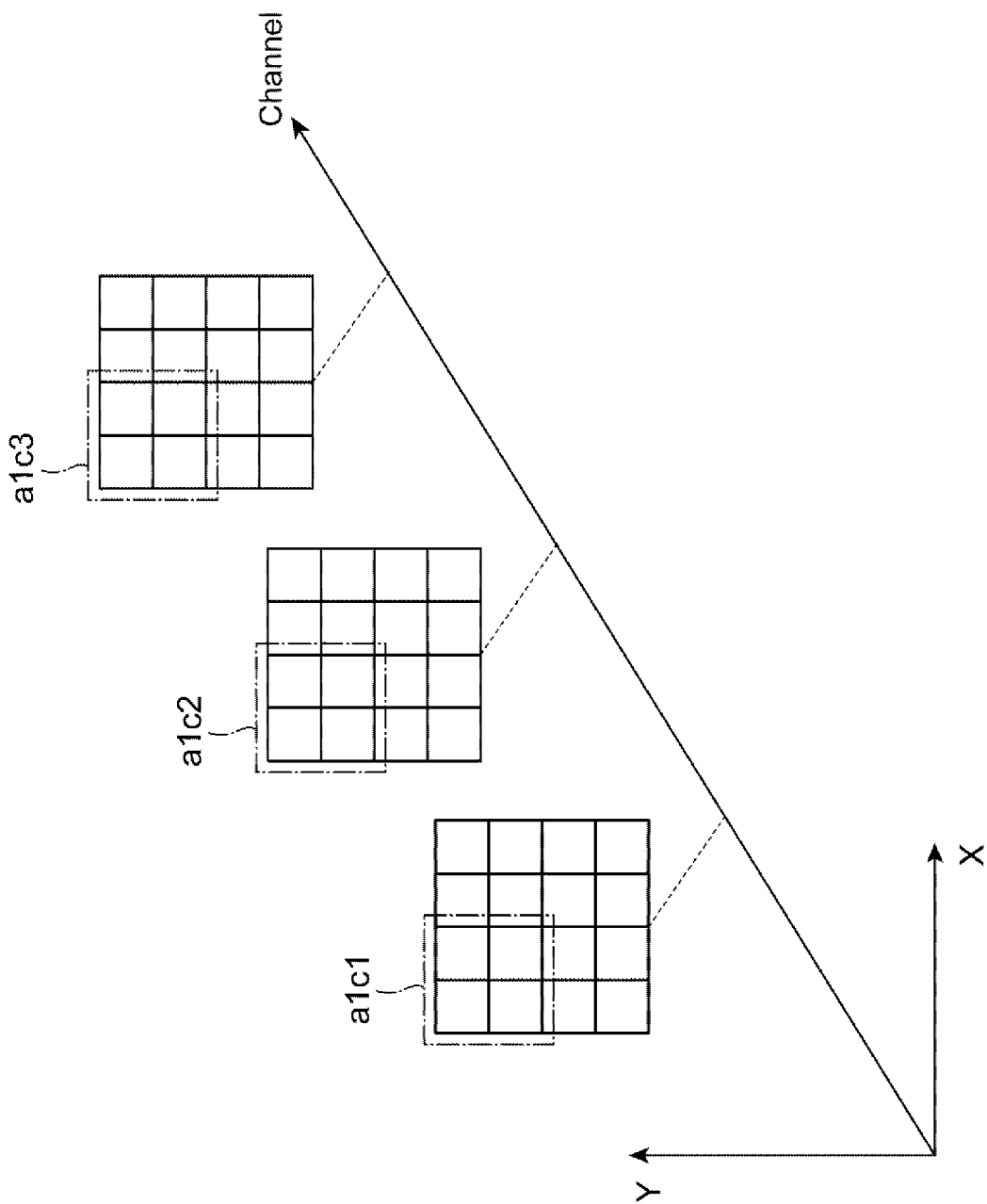
FIG. 11 shows a configuration of image area according to the third embodiment.

FIG. 11 shows a configuration of image area according to the third embodiment. Each of the image areas a1 to a9 (in FIG. 10) has a channel as well known, for example, in the neural network technology and the image processing technology. More specifically, as shown in FIG. 11, for example, the channel of the image area a1 is separated into three. Consequently, the image area a1 is composed of an area-channel a1c1, an area-channel a1c2, and an area-channel a1c3, as shown in FIG. 11. The other image areas a2 to a9 each have the constitution like that of the image area a1.

Similarly to the first embodiment, the neural network system NNS of the third embodiment has the configuration shown in FIG. 3 from the constructional viewpoint.

Figure 12:
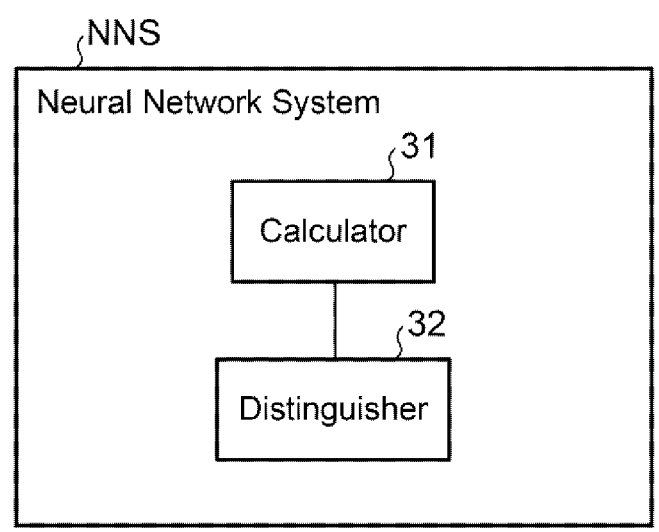
FIG. 12 is a block diagram showing a configuration of the neural network system according to the third embodiment from the functional viewpoint.

FIG. 12 is a block diagram showing a configuration of the neural network system NNS according to the third embodiment from the functional viewpoint. As shown in FIG. 12, from the functional viewpoint, the neural network system NNS of the third embodiment includes a calculator 31 and a distinguisher 32.

With reference to FIGS. 3 and 12, the processor 2 acts as the calculator 31 and the distinguisher 32 by executing on the memory 4 the program 6 in the storage 5.

Figure 13:
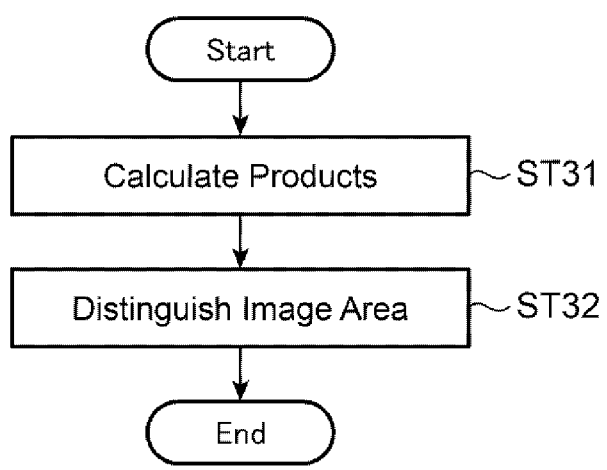
FIG. 13 is a flowchart showing the operation of the neural network system according to the third embodiment.
Figure 14:
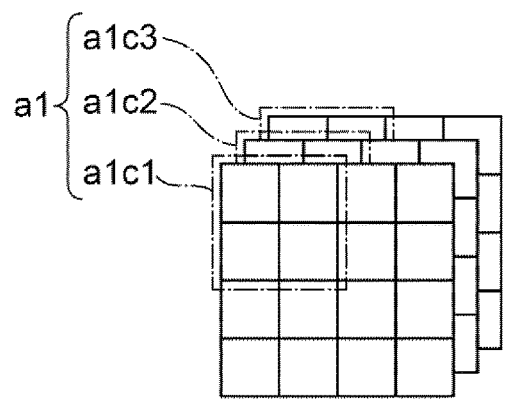
FIG. 14 shows calculation of products for image areas according to the third embodiment.
Figure 14:
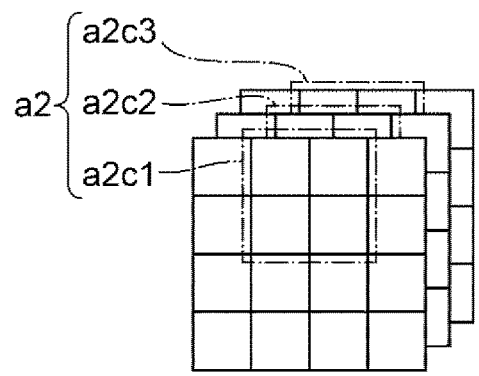
Figure 14:
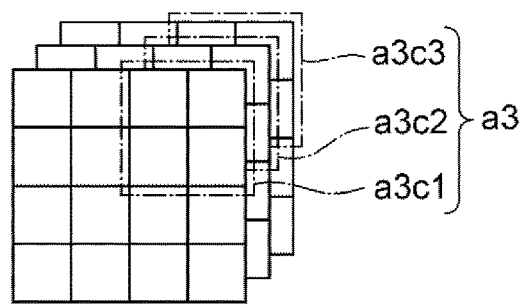
Figure 14:
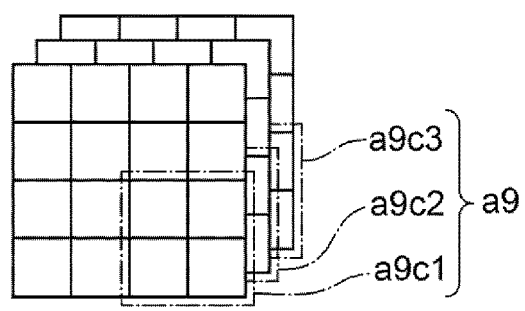

FIG. 13 is a flowchart showing the operation of the neural network system NNS according to the third embodiment. FIG. 14 shows calculation of products for image areas according to the third embodiment.

On receipt of the input data x2, at step ST31, as the calculator 31, the processor 2 calculates a plurality of products relevant to the image areas a1 to a9 laid in the input data x2. More specifically, the processor 2 calculates, for example, the below formula (3) relevant to the image area a1.

$$\sum_{i=1}^{3}(f(a1ci)*b(a1ci)) \quad (3)$$

Similarly to the image area a1, the processor 2 calculates the below formula (4) relevant to the image area a2, the below formula (5) relevant to the image area a3, and further the below formula (6) relevant to the image area a9.

$$\sum_{i=1}^{3}(f(a2ci)*b(a2ci)) \quad (4)$$

$$\sum_{i=1}^{3}(f(a3ci)*b(a3ci)) \quad (5)$$

$$\sum_{i=1}^{3}(f(a9ci)*b(a9ci)) \quad (6)$$

Here, if the product given by the formula (4) is the largest among all the products resulting from the calculation for the image areas a1 to a9, as the distinguisher 32, the processor 2 distinguishes or discriminates the image area a2 corresponding to the above largest product from the other image areas a1, and a3 to a9. More concretely, the processor 2 may visually enhance or highlight the image area a2 for the discrimination or separation above.

As explained above, the neural network system NNS of the third embodiment calculates the plural products on the input data x2 by using the formulas, for example, the above formulas (3) to (6), thus distinguishing the image area a2 corresponding to the largest product, from the other image area a1, and a3 to a9. This facilitates visual recognition of the image area a2 that exacerbates the loss LS of the neural network NNS.

In lieu of distinguishing only between the image area a2 corresponding to the largest product and the other image areas a1, and a3 to a9 as discussed above, the processor 2 may distinguish between several image areas (e.g., a1, a2, and a4) corresponding to larger products and the other image areas (e.g., a3, and a5 to a9) corresponding to smaller products.

What is claimed is:

1. A method comprising:
calculating a plurality of products, each product being generated by multiplying a first result given by applying one of a plurality of input data used for training a machine learning model to a first function that represents a forward propagation of the plurality of input data through the machine learning model, and a second result given by applying the one of the plurality of input data to a second function that represents a backward propagation of a partial differential of a loss through the machine learning model, the loss being generated by summing a plurality of errors between a plurality of desired values that the machine learning model should output in response to the plurality of input data and a plurality of prediction values that the machine learning model outputs in response to the plurality of input data; and
detecting among the plurality of input data, input data that contributes the most to the loss, based on magnitudes of the plurality of products.

2. The method according to claim 1, further comprising:
increasing magnitudes of a plurality of weights used for retraining the detected input data.

3. The method according to claim 1, further comprising:
removing the detected input data; and
retraining the machine learning model using the remainder of the plurality of input data except for the removed input data.

4. The method according to claim 1, further comprising:
in a case where the plurality of input data are a plurality of image data that are each segmented into a plurality of image areas, distinguishing in each of the plurality of image data, at least one image area that contributes more to the loss and other image areas that contribute less to the loss, based on magnitudes of the plurality of products for the plurality of image areas in lieu of the plurality of input data.

5. A system comprising:
a processor to execute a program; and
a storage to store the program which, when executed by the processor, performs processes of,
calculating a plurality of products, each product being generated by multiplying a first result given by applying one of a plurality of input data used for training a machine learning model to a first function that represents a forward propagation of the plurality of input data through the machine learning model, and a second result given by applying the one of the plurality of input data to a second function that represents a backward propagation of a partial differential of a loss given by summing a plurality of errors between a plurality of desired values that the machine learning model should output in response to the plurality of input data and a plurality of prediction values that the machine learning model outputs in response to the plurality of input data, and
detecting among the plurality of input data, input data that contributes the most to the loss, based on magnitudes of the plurality of products.

* * * * *